United States Patent

Hellenkamp et al.

[11] Patent Number: 5,822,927
[45] Date of Patent: Oct. 20, 1998

[54] MOTOR VEHICLE DOOR

[75] Inventors: Michael Hellenkamp, Wesseling; Jörg Ebert, Köhn; Winfried Griep, Bonn; Volker Findeisen, Bochum; Volker Gomon, Stuttgart, all of Germany

[73] Assignee: VAW Aluminium AG, Bonn, Germany

[21] Appl. No.: 659,771

[22] Filed: Jun. 6, 1996

Related U.S. Application Data

[63] Continuation-in-part of Ser. No. 265,099, Jun. 24, 1994, abandoned.

[30] Foreign Application Priority Data

Jun. 26, 1993 [DE] Germany ............................ 43 21 282.4

[51] Int. Cl.$^6$ ........................................................ B60J 5/04
[52] U.S. Cl. .................................................. 49/502; 49/503
[58] Field of Search ............................ 49/501, 502, 503; 296/146

[56] References Cited

U.S. PATENT DOCUMENTS

| | | | |
|---|---|---|---|
| 1,796,114 | 3/1931 | Meadowcroft | 49/501 |
| 1,805,663 | 5/1931 | Gilpin | 49/501 |
| 2,760,814 | 8/1956 | Watter | 49/502 |
| 3,808,743 | 5/1974 | Renner | 49/502 |
| 4,118,827 | 10/1978 | Yamamoto | 49/381 |
| 4,328,642 | 5/1982 | Presto | 49/502 |
| 4,662,115 | 5/1987 | Ohya | 49/502 |
| 4,769,951 | 9/1988 | Kaaden | 49/502 |
| 4,843,762 | 7/1989 | Grier | 296/146.5 |
| 4,876,825 | 10/1989 | Widwig | 49/502 |
| 4,969,680 | 11/1990 | Shimoda | 49/502 |
| 5,040,335 | 8/1991 | Grimes | 49/502 |
| 5,056,264 | 10/1991 | Jewell, II | 49/502 |
| 5,226,259 | 7/1993 | Yamagata | 49/502 |
| 5,355,629 | 10/1994 | Kimura | 49/502 |

FOREIGN PATENT DOCUMENTS

| | | | |
|---|---|---|---|
| 222990 | 8/1986 | European Pat. Off. . | |
| 492355 | 12/1991 | European Pat. Off. . | |
| 2257450 | 8/1975 | France . | |
| 4133814 | 4/1993 | Germany . | |
| 405178092 | 7/1993 | Japan | 296/146.5 |
| 1437575 | 5/1976 | United Kingdom | 49/502 |

OTHER PUBLICATIONS

Automotive Engineering, Bd. 101, Nr. 5, May 1993 Design of a Magnesium/Aluminum Door Frame.

Primary Examiner—Daniel P. Stodola
Assistant Examiner—Curtis Cohen
Attorney, Agent, or Firm—Darby & Darby

[57] ABSTRACT

A motor vehicle door has an outer panel and an inner panel. The outer panel is made up of a pair of double-walled, hollow structural members which are self-supporting. A door lock and door hinges are mounted on the outer panel. The inner panel, which is connected to the outer panel, carries all remaining accessories associated with the door, such as the operating mechanisms for a window mounted on the door.

21 Claims, 14 Drawing Sheets

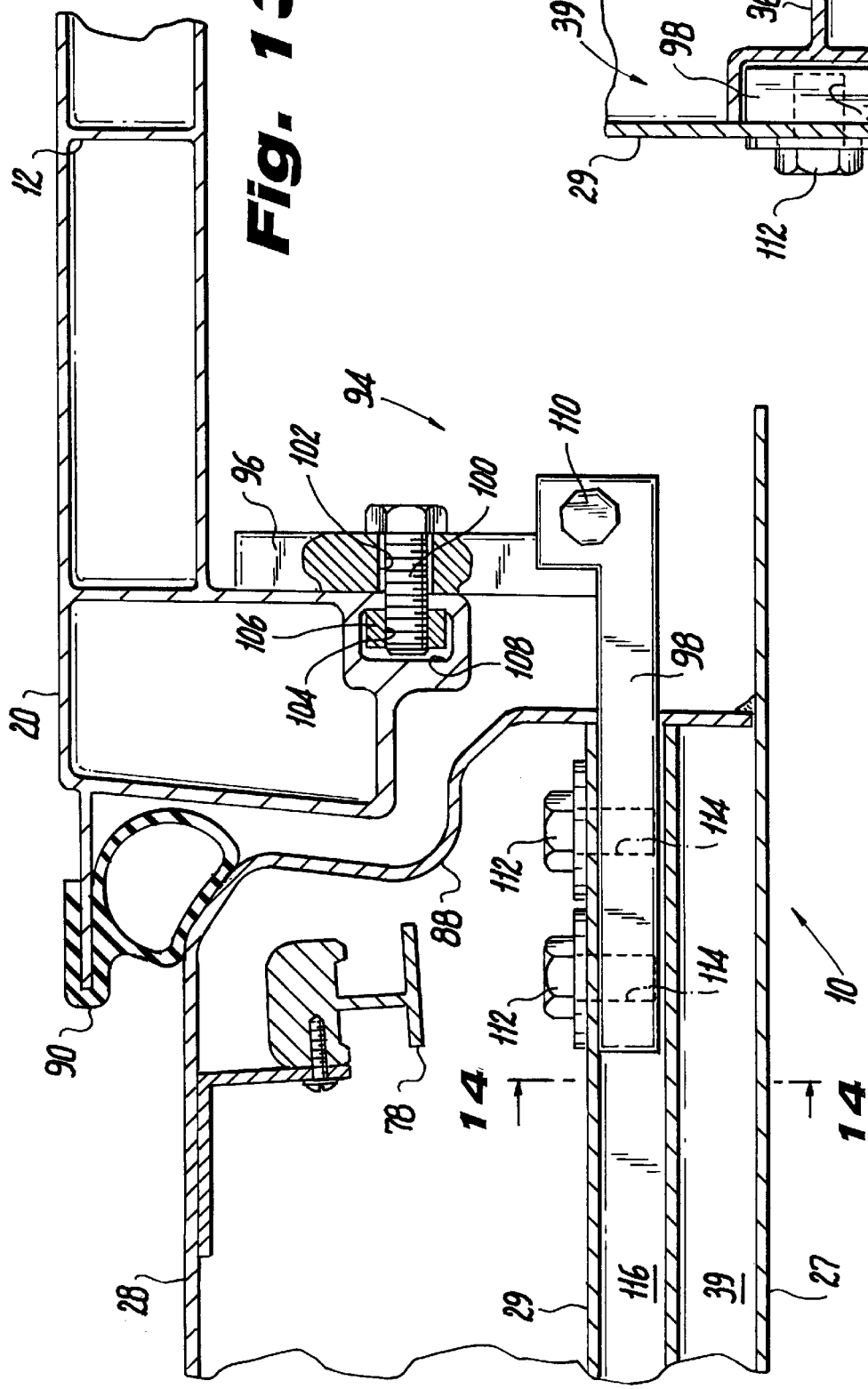
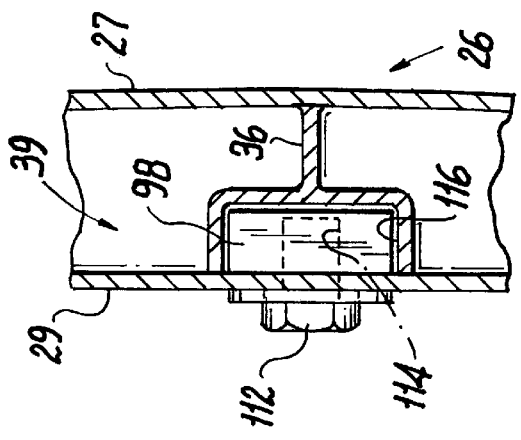
Fig. 13
Fig. 14

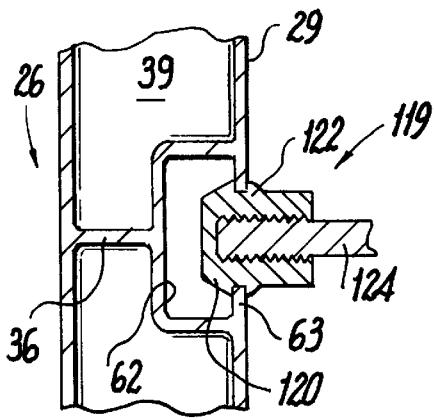
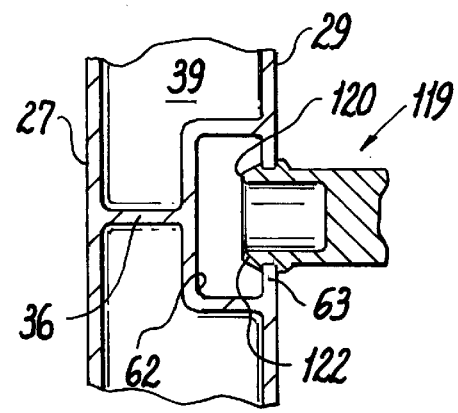
Fig. 19a  Fig. 19b
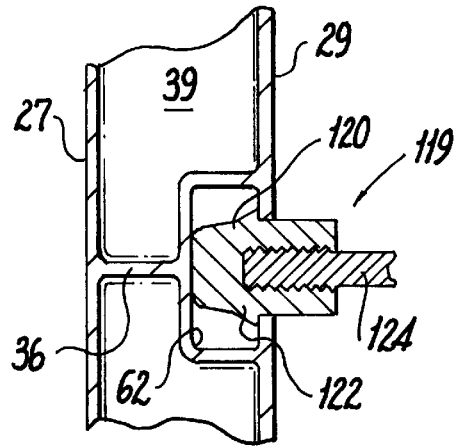
Fig. 19c
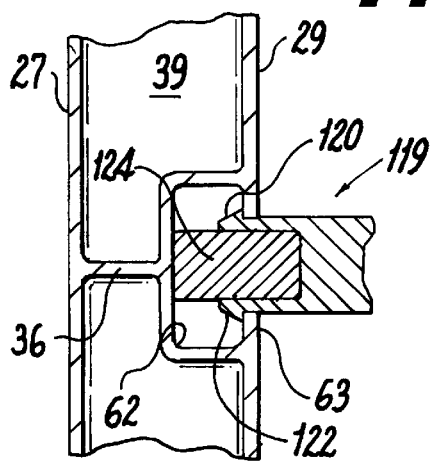
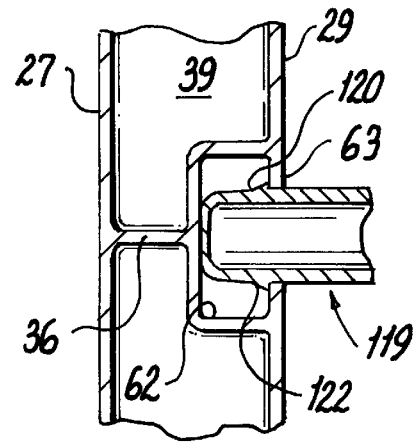
Fig. 19d  Fig. 19e

MOTOR VEHICLE DOOR

This application is a continuation-in-part of application Ser. No. 08/265,099, filed Jun. 24, 1994, now abandoned.

FIELD OF THE INVENTION

The present invention relates generally to automotive body structures, and more particularly, to door assemblies used with automobiles.

BACKGROUND OF THE INVENTION

The door of a motor vehicle typically includes an outer panel and an attached inner panel which together define an intermediate chamber. The chamber accommodates the operating devices for the door including a window and a window operating mechanism, a door-release mechanism, air vents, and speakers. The outer panel is typically flush with the adjacent outer panels (e.g., an adjacent door or fender) of the vehicle. The inner panel supports a lining appropriate for a passenger compartment.

German patent No. 41-33-814 discloses a self-supporting, rigid passenger compartment for a passenger car as well as a method of making the compartment. According to this german patent, lightweight structural elements having different cross sections are joined along their longitudinal edges to form a tubular member. A section of the tubular member having a length equal to the desired length of the passenger car is then severed from the tubular member. Door and window openings are subsequently cut out of the severed section. The pieces removed from the severed section can be used as doors for the passenger compartment by machining the edges and providing the removed pieces with seals, door hangers and locks. When closed, doors made in this manner can transmit longitudinally directed forces in the passenger compartment.

Aside from the special construction disclosed in the above-identified German patent, doors are normally reinforced by installing so-called impact carriers between the inner and outer panels of a door. In the event of a crash, the impact carriers are designed to absorb lateral deforming forces acting on the door and thus protect the occupants from injury.

In the manufacture of conventional vehicle doors, sheet metal parts are used for the outer and inner panels. The sheet metal parts are typically joined using a detachable flange securing system. The parts are then painted (e.g., lacquered) and equipped with various operating components.

During mass production, a door is frequently dismantled after being painted in order to install the intermediate components within the door. Otherwise, the operating components must be installed during final vehicle assembly which is costly.

In conventional double-paneled structures, the panels are made of deep-drawn sheets which are provided with reinforcing sheets, called "doublers", over portions thereof. The steel or aluminum sheets employed in other types of conventional doors are likewise shaped by deep-drawing or stretching. The shaping dies used to form the metal sheets to the desired shape are relatively expensive, particularly because a door often requires more than one die. Accordingly, conventional sheet metal doors can be economically manufactured only in very large numbers.

SUMMARY OF THE INVENTION

It is an object of the invention to provide a low-cost vehicle door which overcomes the deficiencies of the prior art.

Another object of the invention is to provide such a vehicle door which is capable of increasing occupant safety.

An additional object of the invention is to provide such a vehicle door which can be easily repaired.

A further object of the invention is to provide a vehicle door which is fully adjustable with respect to the vehicle.

The preceding objects, as well as others which will become apparent as the description proceeds, are achieved by the invention.

One aspect of the invention resides in a vehicle door comprising an outer panel having a self-supporting panel section, an inner panel connected with the outer panel, and operating means for a vehicle window. The inner panel constitutes a carrier for operating means.

The outer panel includes a plurality of self-supporting panel sections which are designed to be substantially flush with the portions of a vehicle adjacent a door frame. The inner panel supports an internal lining for a passenger compartment. The sections of the outer panel are preferably double-walled entirely or in part and define spaces which are open at either end of the outer panel. The inner and outer panels cooperate to define an intermediate chamber which houses window glass and window operating mechanism. The window operating mechanism is releasably secured to the inner panel.

The door further includes a door lock mechanism and a door hinge which are both mounted on the outer panel.

In accordance with the invention, the safety and protective functions of the door are, to a major extent, separated from the component carrying function of the door. The safety and protective functions are primarily provided by the outer panel while the inner panel mainly serves to carry the operating components. The separation of these functions makes it possible for the strength of the door (i.e., impact prevention structure) to be integrated in a single structural element. Furthermore, since the separation of these functions allows the initial assembly of the outer panel to be independent from that of the inner panel, savings in manufacturing costs can be obtained. In addition, individual operating components can be easily replaced during subsequent assembly and disassembly which improves recycling.

The sections of the outer panel are produced from plastic or metal using various conventional manufacturing processes. The panel sections are self-supporting, rigid and capable of retaining their shapes and meet minimum safety requirements without the installation of additional impact members within the door, while maintaining a low weight. Composite materials as well as laminated layers of materials are suitable materials for the door of the present invention.

The sections of the outer panel are longitudinally oriented and extend the entire length of the door. The sections of the outer panel include integrally formed threaded and/or undercut openings for securing the inner panel to the outer panel.

The sections of the outer panel are preferably made from an aluminum alloy which provides ease of manufacture regardless of the complexity of the desired shape of the outer panel. The characteristics of aluminum include a favorable relationship between strength, elongation and deformation which, in the event of a crash, result in maximizing safety. Furthermore, aluminum can be used for other door components to simplify and maximize recycling.

In principle, the inner panel is made from any appropriate material that has sufficient strength to carry the required components. These components include a window frame as well as the following door components which are conventionally inserted between the inner and outer panels of a vehicle door: window guide rails, a window crank, a window displacement mechanism, and a servomotor (if the windows are electrically operated), and audio speakers.

Inner panel is preferably formed using a pressure casting process so that complex features and elements of the door may be easily and accurately incorporated, for example, mounting elements used to support an arm rest of the door, and undercuts, channels and recesses, which normally cause problems in large structural components.

The inner panel is secured to the outer panel in one of several ways. In one embodiment, where the outer panel sections are made of laminated layers, it is preferable to connect the inner and outer panels using integral or secured and recessed threaded elements. A continuous drilling process may be used to create the required recesses. If the outer panel sections consist of aluminum extrusions, according to another embodiment, it is preferred that the inner panel be attached to the outer panel using an undercut (channel) arrangement and/or threaded openings formed integral with the extrusions. The door hinges can similarly be positioned in undercut openings or channels provided in the outer panel and can be secured thereto using clamp-blocks or other clamping elements which may be selectively displaced within the channel during adjustment.

As is known from conventional door construction, lateral projection of the outer door surface over the door frame is advantageous for various reasons. According to the invention, a laterally projecting portion of this type is provided and is designed in such a manner that, in the event of a crash, the outer panel remains anchored in the door frame even after substantial deformation. This results in increased occupant safety.

The outer panel sections preferably include a multicompartment structure which further increases the section modulus of the outer panel (i.e., the panel of this construction is rigid and strong). In such instance, the compartments are preferably divided by longitudinally oriented partitions (preferably formed integral with the outer panel) which extend the length of the door (measured front to back) and are oriented perpendicular to the inner surfaces of the outer panel. The section modulus can be approximated by the following equation:

$$I = B \times S^3 / 12 + 12 \times S \times B \times H^2$$

where B is the height of the door, S the wall thickness of the outer panel sections and H the depth of the door.

The 6000 series of aluminum alloys provides an optimum balance between strength, ease of manufacture, and recycling characteristics due to the presence of certain specific alloying elements, as is known by those skilled in the art.

The inner panel is provided with extensions which are attachable along the vertical sides of the door. These extensions are designed to laterally cover the otherwise open ends of the compartments of the outer panel. A complete vehicle door can then be formed from the inner and outer panels without additional covers, linings or reinforcements.

BRIEF DESCRIPTION OF THE DRAWINGS

Other features and advantages of the invention will be forthcoming from the following detailed description of preferred embodiments when read in conjunction with the accompanying drawings.

FIG. 13 is a partial section view of the door, taken along the line 13—13 of FIG. 1, showing details of the door in relation to the door frame including the door hinge, according to the invention;

FIG. 14 is a partial sectional view of the door taken along the line 14—14 of FIG. 13, showing details of a hinge mounting channel, according to the invention;

FIGS. 19a–19e are examples of fasteners used to secure the mounting support to the outer panel, using the mounting support channel, according to the invention;

DETAILED DESCRIPTION OF THE PREFERRED EMBODIMENTS

Figure 1:
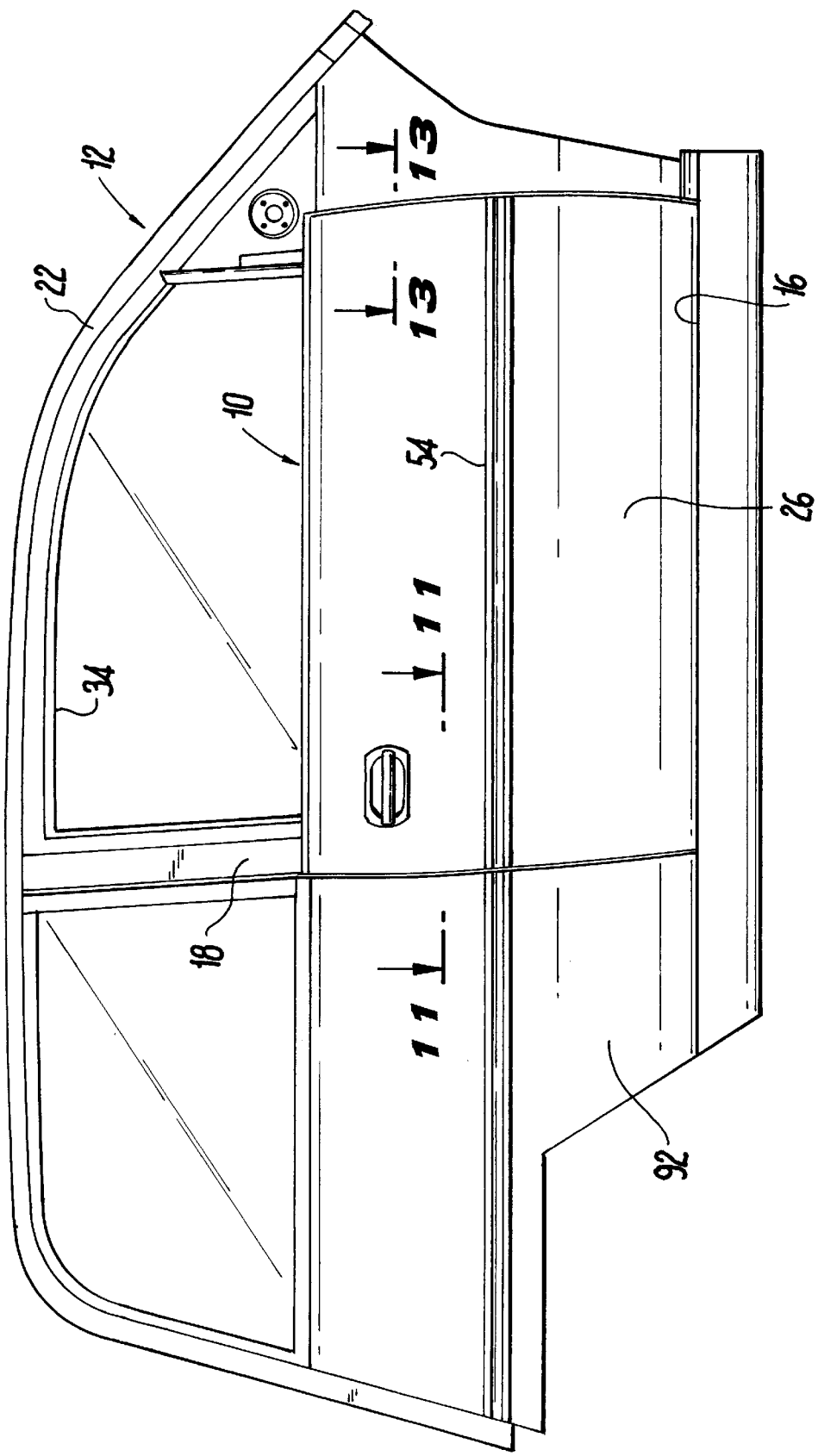
FIG. 1 is a partial outside elevation view of a vehicle body showing a door, a door frame, and an adjacent quarter panel, in accordance with the invention.
Figure 2:
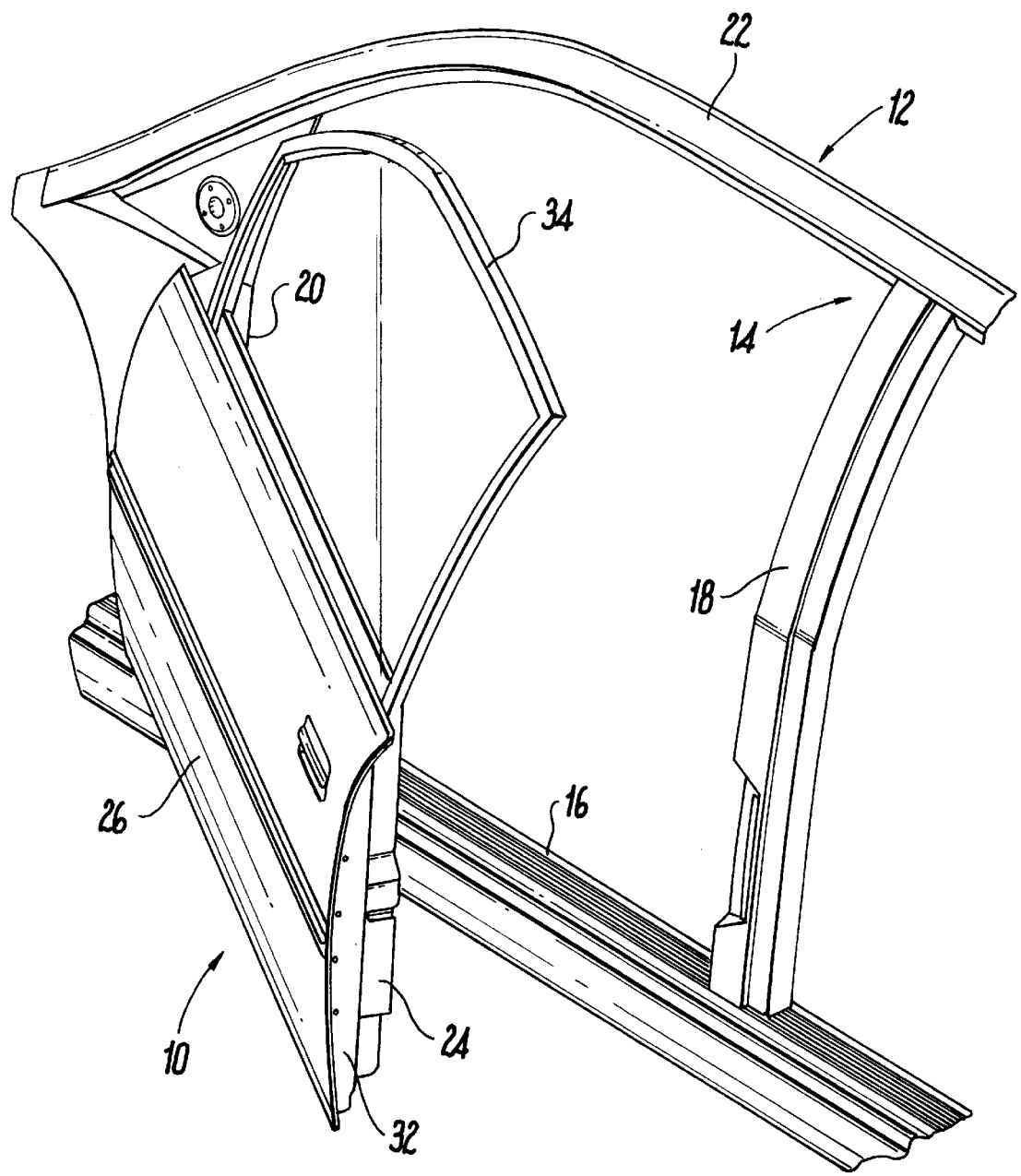
FIG. 2 is a perspective view of the vehicle of FIG. 1, showing the door in an open position with respect to the door frame, in accordance with the invention.

Referring to FIGS. 1–2, a vehicle door 10 is shown mounted to a vehicle body 12. Body 12 includes a door frame 14 having a door sill 16, a latching post 18, a mounting post 20 and a roof-line 22. Latching post 18 is located along a rear edge of door frame 14 and is used as a structural supporting member of the vehicle. Door 10 includes a locking mechanism 24 which is latchable to a latching member (not shown) secured to latching post 18.

Door 10 is hingable mounted to body 12 within door frame 14 and may be pivoted about a hinge axis between a closed position shown in FIG. 1, and an open position shown in FIG. 2. Hinges used to secure door 10 are typically secured to mounting post 20, however other arrangements are possible without departing from the gist of the invention.

Figure 3:
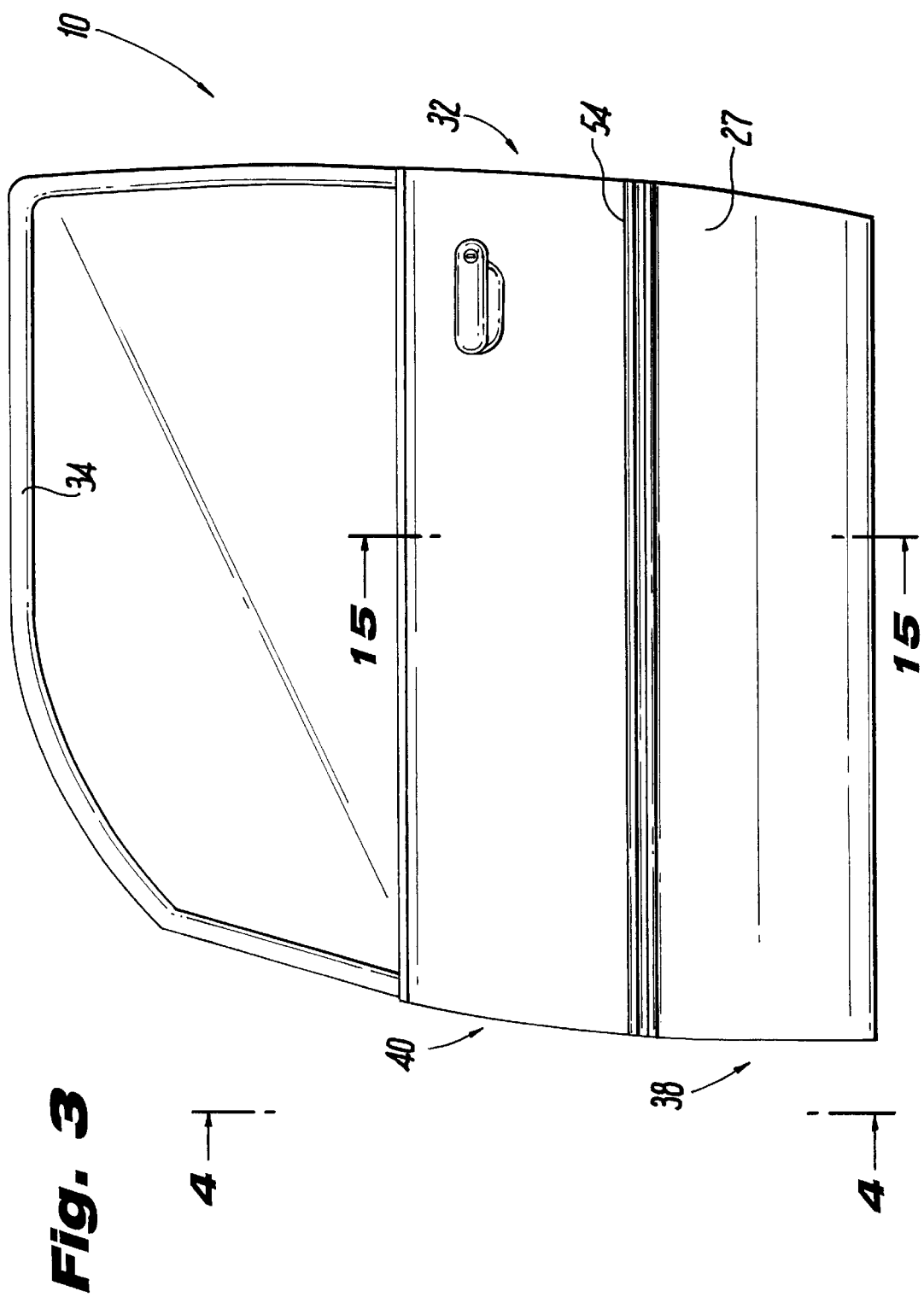
FIG. 3 is an outside elevation view of the vehicle door of FIG. 1, showing an outer panel and a window frame, in accordance with the invention.
Figure 4:
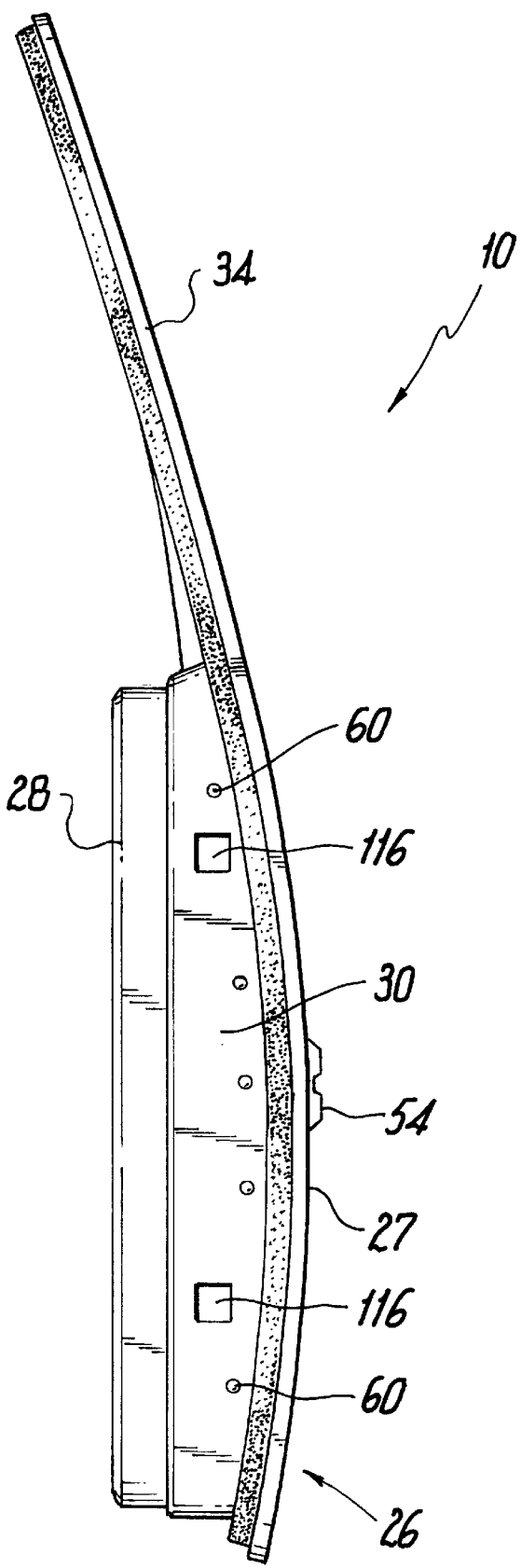
FIG. 4 is a front elevation view of the vehicle door taken along the lines 4—4 of FIG. 3, in accordance with the invention.
Figure 5:
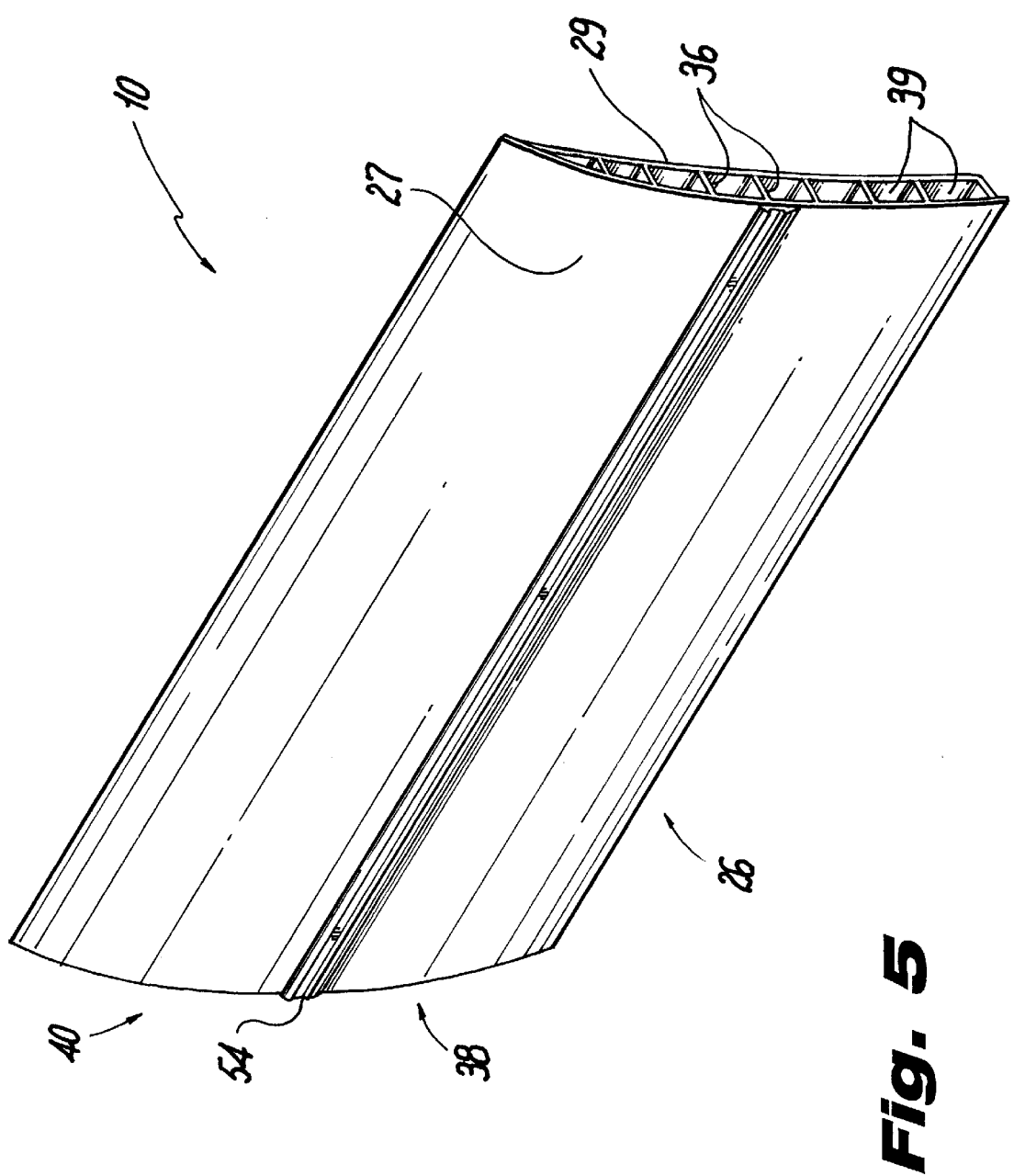
FIG. 5 is a perspective view of a vehicle door, showing compartment details of the outer panel, in accordance with the invention.

Referring to FIGS. 3–4, door 10 includes an outer panel 26, an inner panel 28, a front surface 30 and a rear surface 32. A window frame 34 is secured to door 10, as described below.

Referring to FIGS. 15–18, outer panel 26 is preferably made as an aluminum alloy extrusion using aluminum alloys of the 6000 series. Outer panel 26 includes outer sheet 27 and an inner sheet 29 (i.e., at least partially double-walled). The two sheets 27 and 29 are secured to each other with integrally formed longitudinally oriented partitions 36 which lie perpendicular to sheets 27 and 29. Partitions 36 define longitudinally oriented compartments 39. Compartments 10, which are open at either end of outer panel 26, serve to stiffen outer panel 26 which forms a double-walled, multicompartment safety component. Partitions 36 are preferably formed integrally with outer panel 26, such as during an extrusion process.

Figure 17:
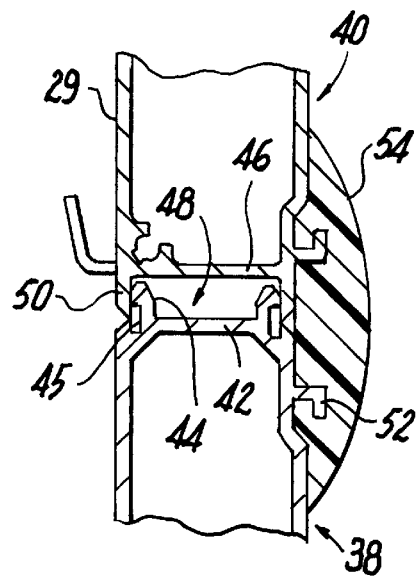
FIG. 17 is an enlarged sectional view of the door of FIG. 15, showing details of a lower edge of the upper outer panel secured to an upper edge of the lower outer panel, and a molding strip, according to the invention.

Outer panel 26 is further made up of two sections, a lower section 38 and an upper section 40. These two sections 38, 40 are preferably secured to each other along an adjacent longitudinal edge, as shown in FIG. 17. An upper edge 42 of lower section 38 includes two projections 44, preferably extending the length of door 10. Projections 44 include locking channels 45. A lower edge 46 of upper section 40 includes a receiving channel 48 defined by two opposing walls 50. Projections 44 are sized and shaped to snugly fit within receiving channel 48 adjacent to the inside surfaces of walls 50. Once fitted, walls 50 may be inwardly deformed (towards each other) along the length of door 10 and into binding engagement with adjacent locking channels 45. Alternatively, an appropriate adhesive or fastener may be used to secure upper edge 42 to lower edge 46 to form a complete outer panel 26.

A feature of the present invention is that the outer panel 26, however it is formed, is a self supporting structure and does not rely on any other component for support or strength. The purpose of the outer panel 26 is to support inner panel 28, indirectly support door-related operating components, and provide a structurally secure closure across door frame 14 to prevent injury to occupants, in the event of an impact with the vehicle.

Located adjacent to upper edge 42 and lower edge 46 are longitudinal flanges 52 extending outwardly from outer panel 26. Flanges 52 are adapted to receive and secure an appropriate molding strip 54, which functions to hide the seam between upper and lower sections 38, 40 and to protect door 10 from minor damage.

Inner panel 28 is made from an appropriate material including sheet metal, such as steel or aluminum, or a strong rigid plastic, such as fiberglass. Alternatively, inner panel 28 may be composed of one or more pressure castings or may be produced by a compound casting process. Inner panel 28 can also be made from one or more deep-drawn sheets or from a shaped or profiled member. It is further possible to produce inner panel 28 from one or more injection molded or fiber-reinforced plastic parts.

Figure 15:
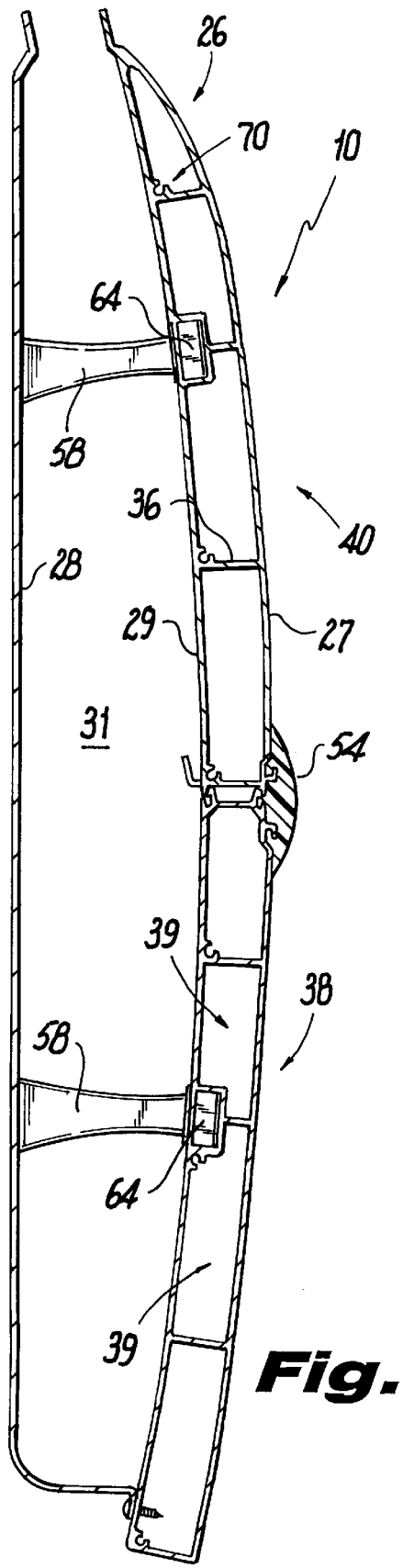
FIG. 15 is a cross-sectional of the door, taken along the line 15—15 of FIG. 3, showing details of an upper outer panel, a lower outer panel, the longitudinal compartments, an inner panel, a mounting support, and a mounting support channel, according to the invention.
Figure 16:
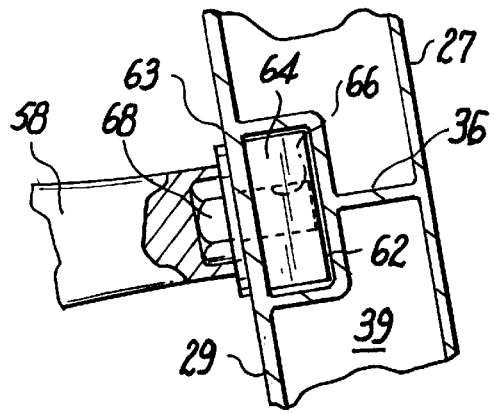
FIG. 16 is an enlarged sectional view of the door of FIG. 15, showing details of the mounting support channel and a mounting support, according to the invention.
Figure 18:
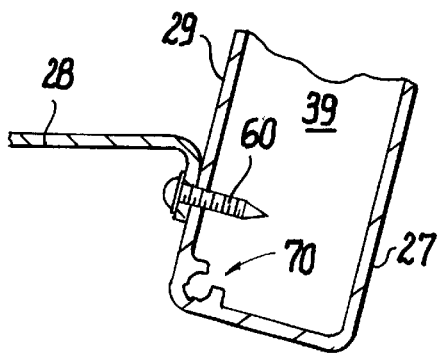
FIG. 18 is an enlarged sectional view of the door of FIG. 15, showing a fastener securing a lower portion of the inner panel to a lower portion of the outer panel, according to the invention.

Inner panel 28 is secured to inner sheet 29 of outer panel 26, as illustrated in FIGS. 15, 16 and 18, using supports 58 and screw fasteners 60. Inner panel 28 and outer panel 26 define an intermediate cavity 31 into which door-related operating components are located and/or mounted. Supports 58 are either formed integrally with inner panel 28 or are attached thereto using an appropriate fastener or adhesive (not shown). Outer panel 26 includes support channels 62 having flanges 63 and which preferably extend the length of the door 10. Channels 62 are adapted to longitudinally receive a block 64 along an inside surface. Block 64 includes a threaded opening 66 which engages a threaded fastener 68. Each support 58 includes an opening (not shown) which is adapted to receive threaded fastener 68 and secured to block 64. Upon tightening of threaded fastener 68 into block 64, block 64 and intermediate support 58 are drawn together, frictionally contacting flanges 63 and thereby fastening supports 58 (and inner panel 28) to outer panel 26. When threaded fastener 68 is loose with respect to block 64, block 64 may be displaced longitudinally within its respective channel 62. This provision of longitudinal displacement is useful for adjusting the position of inner panel 28 with respect to outer panel 26.

Although supports 58 bear much of the weight of the inner panel 28 (and attached components), additional fasteners, such as screws, bolts, clips, adhesive, or rivets can be used to secure the periphery of inner panel 28 to inner sheet 29 of outer panel 26, as shown in FIG. 18.

Figure 6:
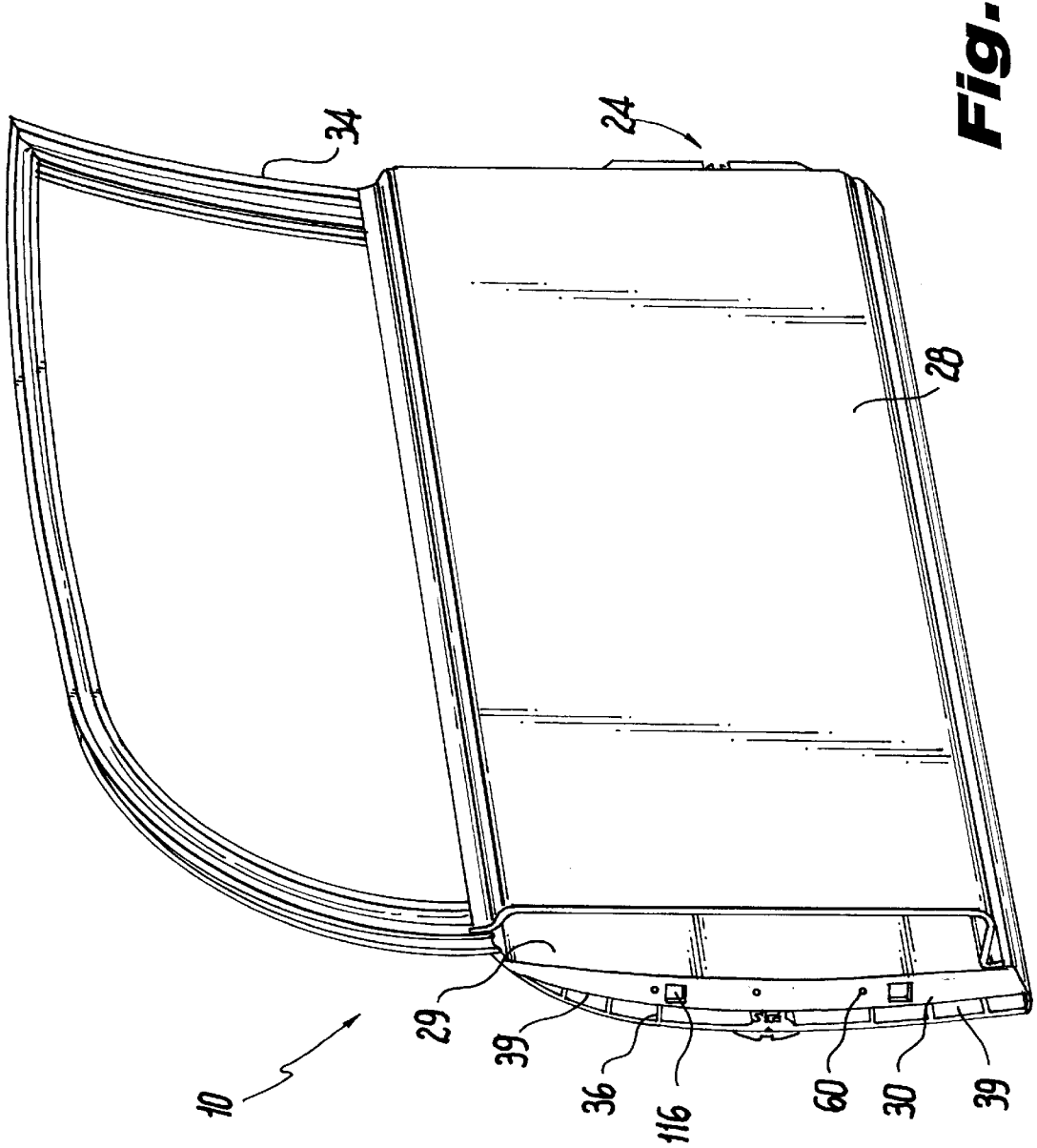
FIG. 6 is a front perspective view of a vehicle door, in accordance with the invention, showing location details of fasteners used to secure an inner panel to the outer panel.

As shown in FIG. 15, a fastener-receiving boss 70 is preferably integrally formed within each compartment 39, adjacent to each partition 36. Bosses 70 are adapted to receive fasteners 72 used to secure an end section 74 across front surface 30 and rear surface 32, as shown in FIG. 6.

Referring to FIGS. 7, 8, 9, and 10, a purpose of inner panel 28 is to support the various door-related operating components including a window pane 76, window guide channels 78, window frame 34, window displacement mechanism 80, window crank 82, or window drive motor 84 (if the window is electrically driven), and speakers 86. According to the invention, it is preferred that only door lock mechanism 24 and hinges 94 be secured to outer panel 26. All other components are secured to inner panel 28 and may be installed thereto before inner panel 28 is secured to outer panel 26. Once inner panel 28 is attached to outer panel 26, many of the door-related operating components are located within intermediate cavity 31, but secured only to inner panel 28.

Figure 7:
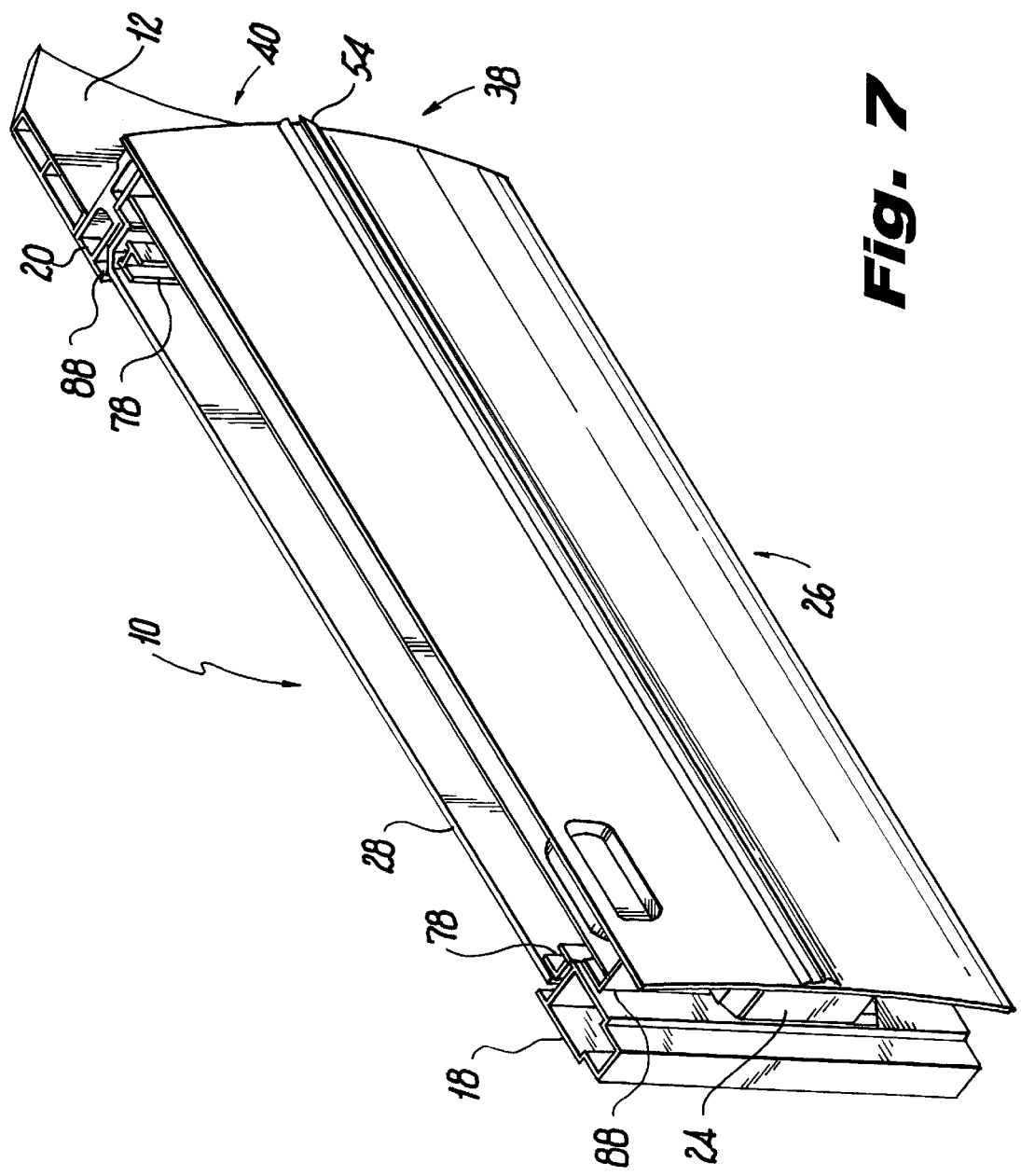
FIG. 7 is a partial perspective sectional view of the door and vehicle body of FIG. 1, according to the invention.
Figure 8:
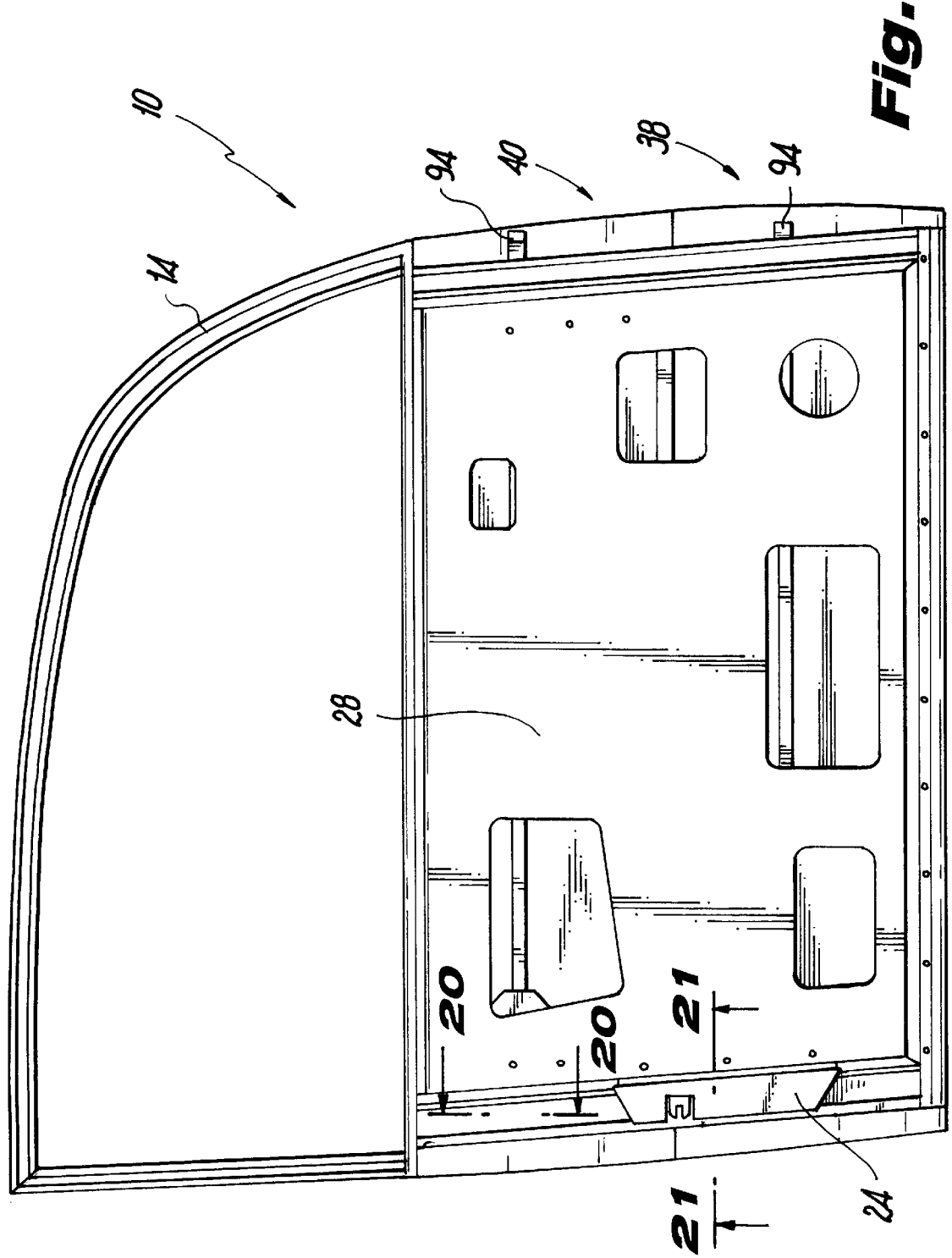
FIG. 8 is an inside elevation view of the door of FIG. 3, showing details of the inner panel, according to the invention.
Figure 9:
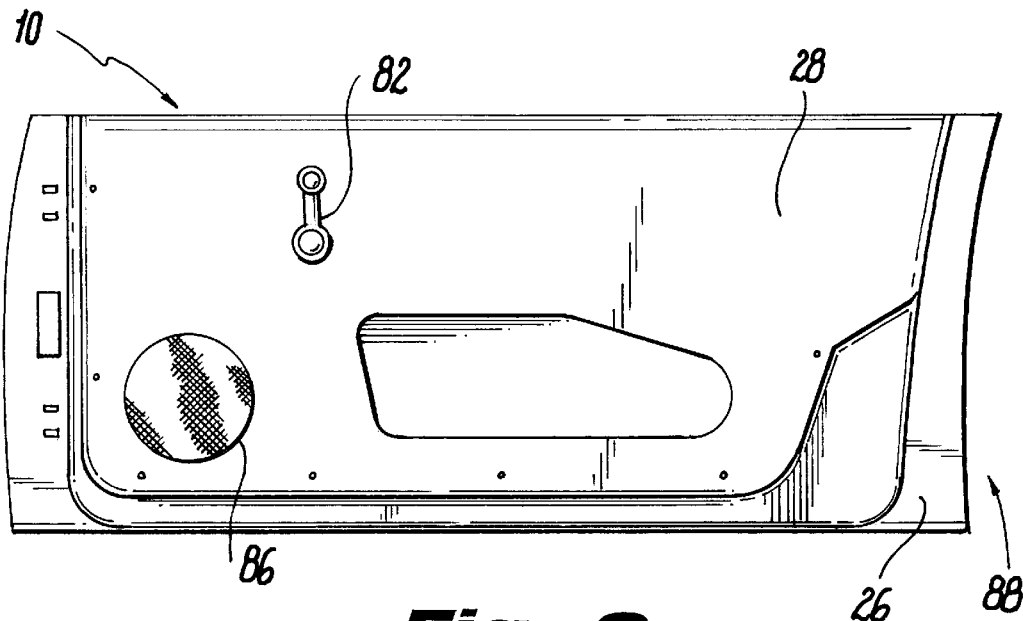
FIG. 9 is an inside elevation view of a door, showing an inner panel supporting various door-related operating components, according to the invention.
Figure 10:
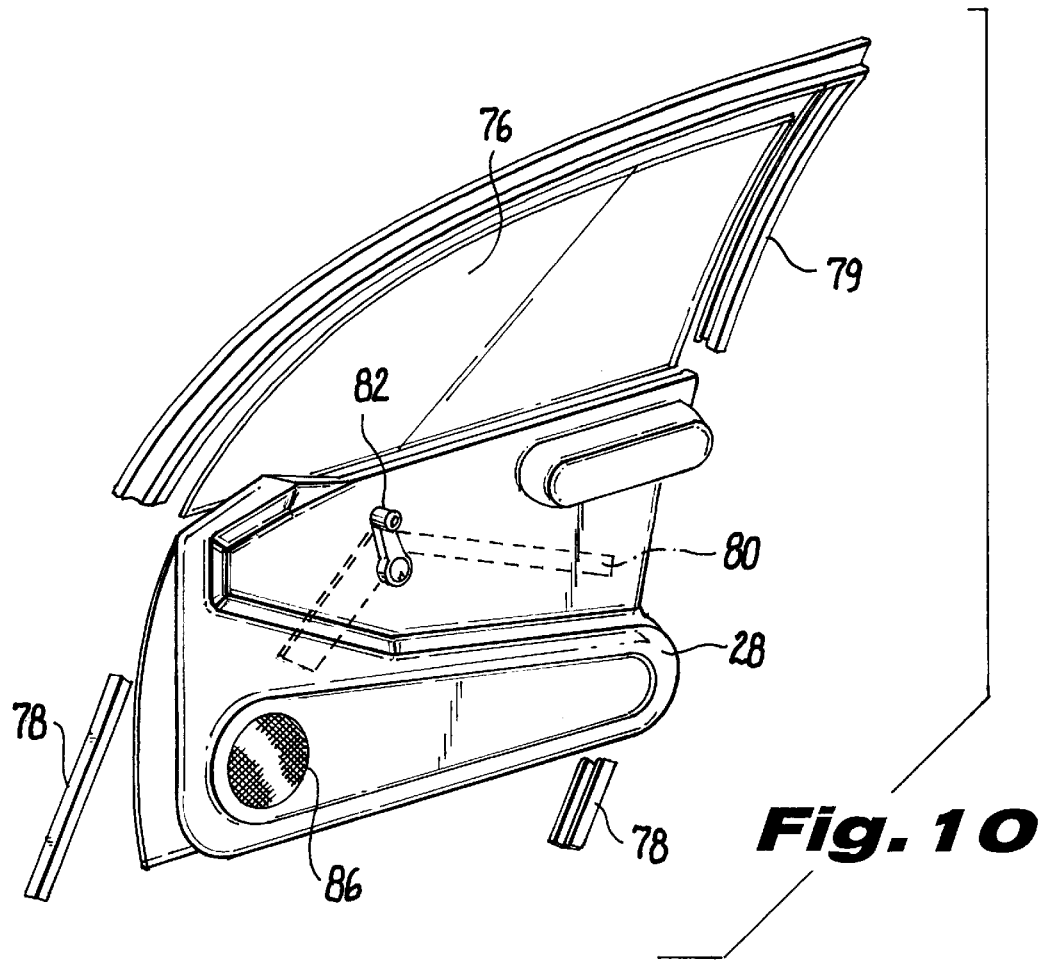
FIG. 10 is a perspective assembly view a door showing the door-related operating components in relation to the inner panel, according to the invention.

As shown in FIGS. 7 and 9, inner panel 28 is provided with front and rear laterally projecting portions 88 which are arranged to overlie mounting post 20 and latching post 18, respectively. Alternatively, laterally projecting portions 88 can be formed integral with outer panel 26. Regardless of their location, laterally projecting portions 88 protect the occupants of the motor vehicle from side impacts in the event of a crash by binding within frame 14 during an impact and preventing displacement into the passenger compartment.

Figures 11, 12:
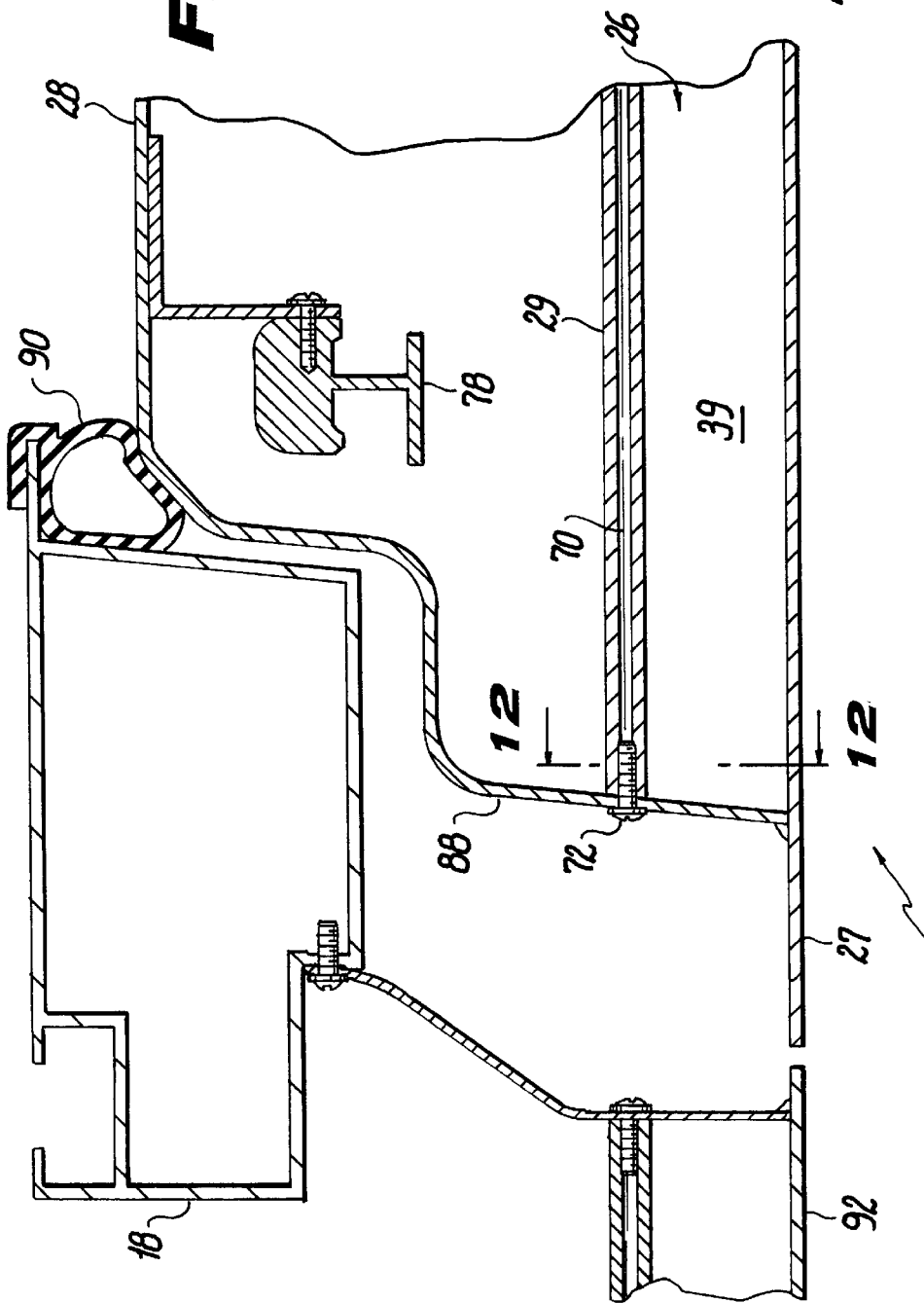
FIG. 11 is partial sectional view of the door, taken along the line 11—11 of FIG. 1, showing details of the door in relation to an upright of the vehicle body, according to the invention.
FIG. 12 is a partial sectional view of the door, taken along the line 12—12 of FIG. 11, showing details of a longitudinal compartment and integral fastener boss, according to the invention.

Referring to FIGS. 11 and 12, a sectional view of door 10 in relation to latching support 18 (in a closed position) is shown. Door frame 14 includes an appropriate rubber seal 90 which is secured to body 12 in such a manner to provide a seal between door 10 and door frame 14, when door 10 is in its closed position. Furthermore, although not required, it is preferred outer sheet 27 of outer panel 26 is coplanar with adjacent panels of body 12, such as a rear quarter panel 92 or a front fender (not shown).

Fasteners 72 are used to secure laterally projecting portions 88 to outer panel 26. Fasteners 72 anchor to bosses 70 located adjacent to or integral with partitions 36, as shown in FIG. 12. Rear laterally projecting portion 88 is shaped to accommodate latching support 18, as shown.

Referring to FIGS. 13 and 14, a sectional view of door 10 in relation to mounting support 20 is shown (with door 10 in a closed position). Door 10 is attached to body 12 using preferably two hinges 94. One of the two hinges 94 is shown in FIG. 13 including a mounting arm 96 and a pivot arm 98. Mounting arm 96 is secured to vertical mounting support 20 using appropriate fasteners 100, such as bolts. Each fastener 100 (if more than one is used) passes through an opening 102 formed in mounting arm 96 and engages with a threaded opening 104 of a vertical adjustment block 106. Block 106 is slidably secured within a channel 108 formed integral with or attached to mounting support 20. Channel 108 is generally vertically disposed and provides selective vertical displacement of each hinge 94 with respect to door 10. Vertical adjustment of door 10 is typically required when fitting door 10 within door frame 12, as may be appreciated by those skilled in the art.

Pivot arm 98 (of each hinge 94) is pivotally connected to mounting arm 96 by pin 110. Pivot arm 98 is secured to outer panel 26 with preferably two appropriate fasteners 112, as shown in FIGS. 13 and 14, which are adapted to engage with threaded openings 114 located in pivot arm 98. Pivot arm 98 is positioned within a hinge mounting channel 116 at front surface 30. Fasteners 112 are used to draw each pivot arm 98 tightly against a flange portion 118 of its respective mounting channel 116 and thereby secure each pivot arm 98 to outer panel 26. When fasteners 112 are loose in their respective threaded openings 114, pivot arm 98 may be horizontally displaced within mounting channel 116 so that horizontal adjustment of door 10 may be made with respect to door frame 14. Once correctly positioned, fasteners 112 may be tightened.

In a preferred embodiment, support channel 62 is used to secure both supports 58 and pivot arms 98 to outer panel 26.

Referring to FIGS. 19a–19e, various types of fasteners 119 are shown. Any of these fasteners 119 may be used to secure supports 58 to within support channel 62. Supports 58 may be secured to fastener 119 or fastener 119 may be formed integral with support 58, as shown in FIG. 20.

Each of the fasteners 119 illustrated in FIGS. 19a–19e, includes an elastic portion 120 and a locking portion 122. Elastic portion 120 deflects when fastener 119 is inserted between flanges 63 of channel 62. Locking portion 122 of each fastener 119 is adapted to receive and secure both flanges 63. Fasteners 119 shown in FIGS. 19a, 19c and 19d include a spreading element 124 which is adapted to be received within a bore 126 located in fastener 119. Spreading element 124 functions to force locking portion 122 into tight engagement with captured flanges 63. Fasteners 119 shown in FIGS. 19b and 19e utilize both flanges 63 and an opposing surface within channel 62 to secure support 58 to outer panel 26.

Figure 20:
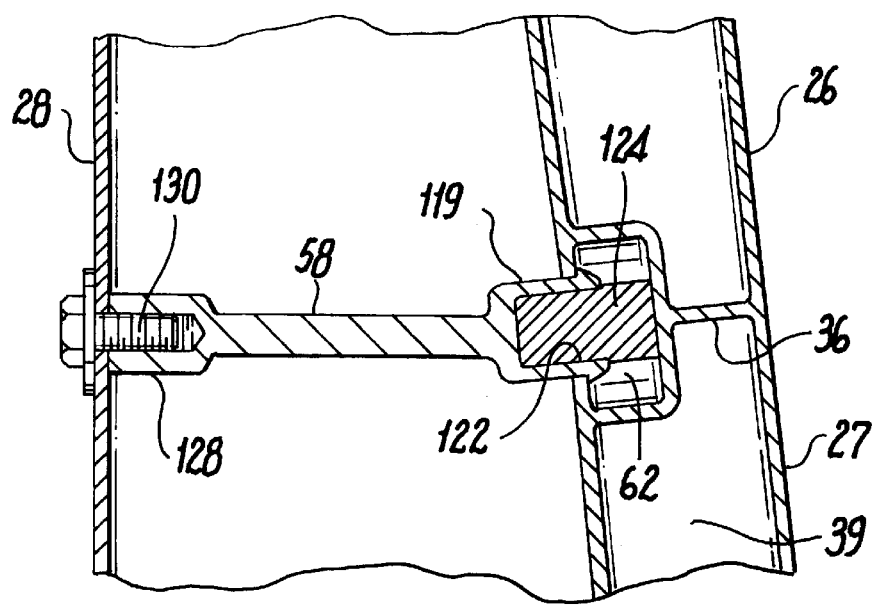
FIG. 20 is a partial sectional view of the door, taken along the line 20—20 of FIG. 8, showing details of a mounting support securing the inner panel to a curved section of the outer panel, according to the invention.

Referring to FIG. 20, support 58 is provided with an integral fastener 119 at an outer end which is adapted to engage with flanges 63 of channel 62, and a threaded boss 128 at an inner end which is adapted to receive a threaded fastener 130. Threaded fastener 130 is used to secure inner panel 28 to support 58. Support 58 is either preshaped or flexible to accommodate outer panels having curved or otherwise irregular shapes.

Figure 21:
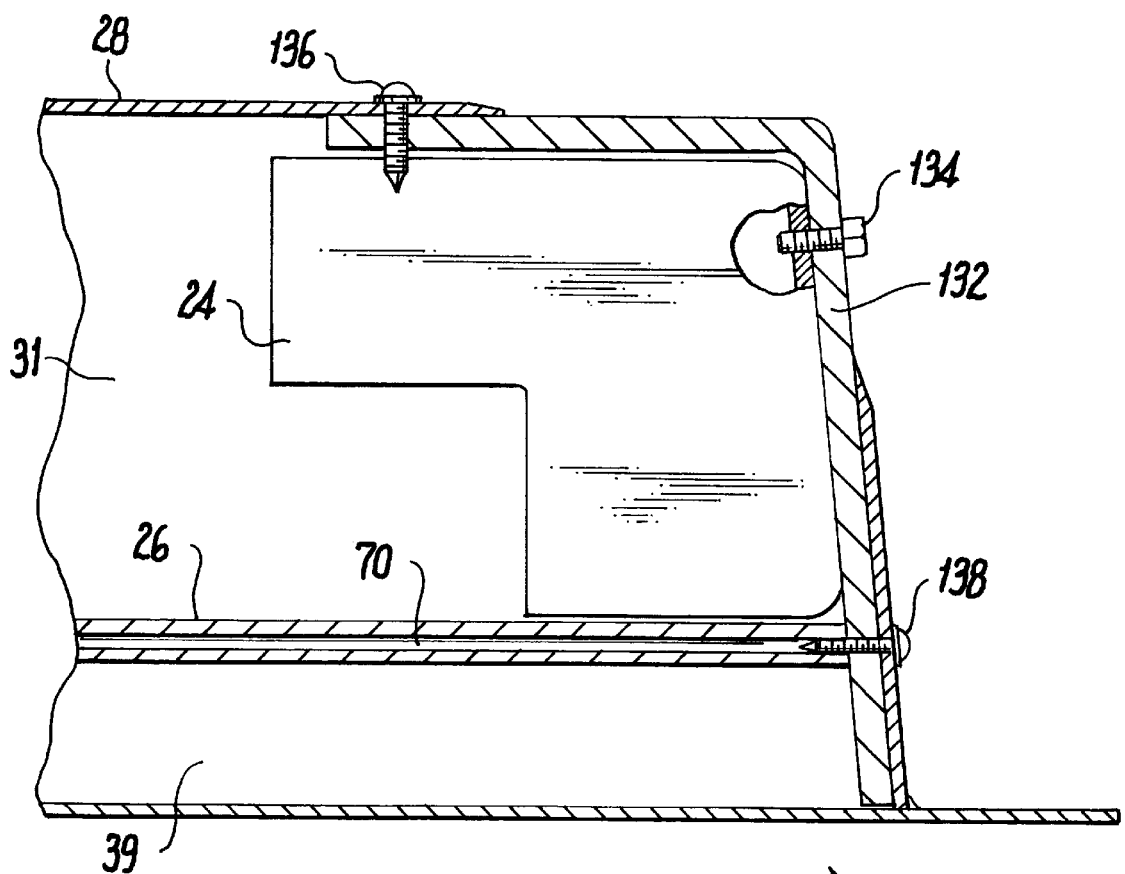
FIG. 21 is a partial sectional view of the door, taken along the line 21—21 of FIG. 8, showing mounting details of a door-lock mechanism in relation to the inner and outer panels, according to the invention.

Referring to FIG. 21, a partial sectional view of door 10 is shown including inner panel 28, outer panel 26, door lock mechanism 24, and a rear surface panel 132. In this embodiment, door lock mechanism 24 is secured to rear surface panel 132 using fasteners 134. Rear surface panel 132 is secured to both inner panel 28 using fasteners 136 and to outer panel 26 using fasteners 138.

Various modifications can be made within the meaning and range of equivalence of the appended claims.

What is claimed is:

1. A vehicle door, comprising
a hollow outer panel assembly, an inner panel connected to said hollow outer panel assembly, said hollow outer panel assembly being made from an interior wall section and an exterior wall section, said two wall sections defining an interposed cavity, said hollow outer panel assembly having at least one partition located generally perpendicular and attached to said wall sections, said at least one partition defining at least two compartments located within said cavity; and
a fastening support assembly attached to said interior wall section of said hollow outer panel assembly and said inner panel so that said inner panel is secured to said hollow outer panel assembly;
said interior wall section of said hollow outer panel assembly being provided with at least one integrally formed elongated locking channel which is sized and shaped to receive a portion of said fastening support assembly so that said fastening support assembly may be selectively secured to said interior wall section within said elongated locking channel.

2. The door of claim 1, wherein said one recess is provided in said hollow outer panel assembly and further comprising a clamping block for fixing said hinge in a one recess, said outer panel having two dimensions which define a plane, and said block being shiftable in said plane.

3. The door of claim 1, wherein said exterior wall section is generally adapted to be aligned with and coplaner to adjacent body panels of a vehicle.

4. The door of claim 3, wherein a self-supporting panel section comprises an aluminum-based extrusion.

5. The door of claim 1, further comprising operating means for a vehicle window, said operating means being mounted to said inner panel.

6. The door of claim 5, wherein said hollow panel assembly and said inner panel define an intermediate chamber and said operating means is located in said chamber.

7. The door of claim 1, further comprising a door lock and a door hinge, said lock and said hinge being mounted on said hollow outer panel assembly.

8. The door of claim 1, further comprising a lining for a vehicle passenger compartment, said lining being mounted on said inner panel.

9. The door of claim 1, wherein said hollow outer panel assembly comprises an aluminum-based extrusion.

10. The door of claim 1, further comprising a window frame fixable to said inner panel.

11. The door of claim 10, wherein said frame comprises an extrusion.

12. The door of claim 1, wherein said inner panel comprises a pressure casting.

13. The door of claim 1, wherein said hollow outer panel assembly is provided with a cutout; and further comprising a door hinge received in said cutout, and a clamping block for fixing said hinge in said cutout, said outer panel having two dimensions which define a plane, and said block being shiftable in said plane.

14. The door of claim 1, wherein at least one of said hollow outer panel assembly and said inner panel is provided with a laterally projecting portion arranged to overlap a door frame.

15. The door of claim 1, wherein at least one of said hollow outer panel assembly and said inner panel comprises a 6000 series aluminum alloy extrusion.

16. The door of claim 1, wherein said compartments of said hollow outer panel assembly includes opposing open ends, said inner panel having marginal portions arranged to overlie said opposing open ends.

17. The door of claim 1, wherein said inner panel comprises a deep drawn sheet.

18. The door of claim 1, wherein said inner panel comprises an injection molded or fiber-reinforced plastic panel section.

19. The door of claim 1, wherein said inner panel comprises a plastic or sheet metal panel section.

20. The door of claim 1, wherein said inner panel comprises a compound casting.

21. The door of claim 1, wherein said inner panel comprises a structural panel section.

* * * * *

UNITED STATES PATENT AND TRADEMARK OFFICE
CERTIFICATE OF CORRECTION

PATENT NO. : 5,822,927
DATED : October 20, 1998
INVENTOR(S) : Michael HELLENKAMP et al.

It is certified that error appears in the above-identified patent and that said Letters Patent is hereby corrected as shown below:

On the title page item 75    , Inventor, change "KOHN" to --KOLN--.

Signed and Sealed this

Twenty-fifth Day of May, 1999

Attest:

Q. TODD DICKINSON

*Attesting Officer*     *Acting Commissioner of Patents and Trademarks*